Figure 1:
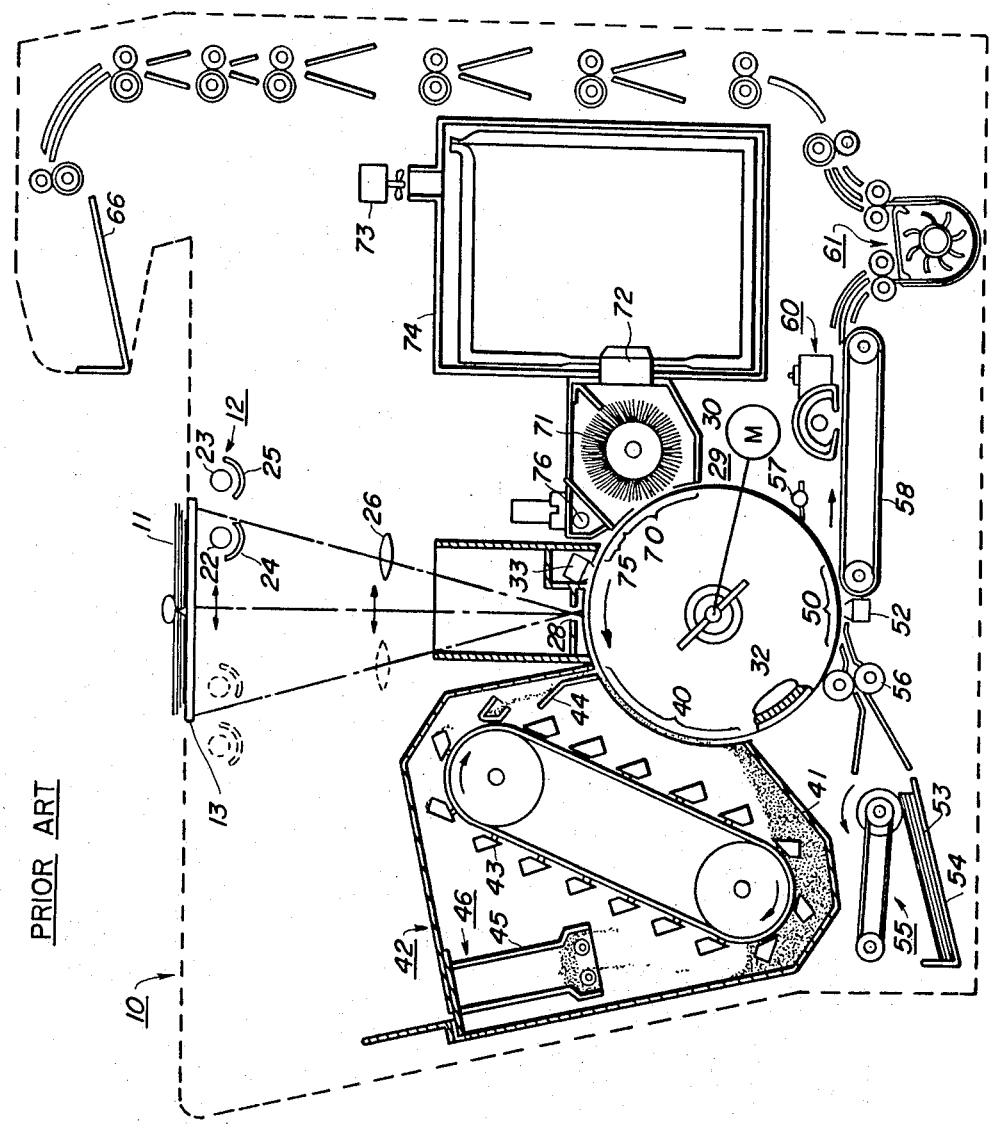

United States Patent [19]

Wilby

[11] 3,869,204

[45] Mar. 4, 1975

[54] SCANNING OPTICAL SYSTEM

[76] Inventor: William Peter Lanham Wilby, 59 Carleton Rise, Welwyn, England

[22] Filed: Feb. 25, 1974

[21] Appl. No.: 445,528

[30] Foreign Application Priority Data
Mar. 1, 1973  Great Britain ..................... 9983/73

[52] U.S. Cl. ...................................... 355/66, 355/8
[51] Int. Cl. ............................................ G03b 27/70
[58] Field of Search ............................. 355/8, 65, 66

[56] References Cited
UNITED STATES PATENTS

| | | | |
|---|---|---|---|
| 3,092,000 | 6/1963 | Williams | 354/7 |
| 3,642,366 | 2/1972 | Kawakubo | 355/8 |

*Primary Examiner*—John M. Horan
*Attorney, Agent, or Firm*—James J. Ralabate; Clarence A. Green; Paul Weinstein

[57] ABSTRACT

An apparatus for reproducing a stationary original supported in a plane upon a platen of given length. The apparatus includes optical means for progressively scanning the surface of the original and for projecting the scanned image on a moving photosensitive surface. The optical means includes two plane reflecting surfaces facing laterally of each other and arranged symmetrically at 45° to a normal to the platen. The length of each of the reflecting surfaces resolved along the platen is greater than half the length of the platen. The reflecting surfaces move parallel to the platen to scan the original. For a 1:1 magnification the reflecting surfaces scan at one-half the velocity of the moving photosensitive surface.

5 Claims, 3 Drawing Figures

SCANNING OPTICAL SYSTEM

This invention relates to a document copying machine and provides an optical system for projecting an image of a stationary original onto a movable photosensitive surface.

The size of document copying machines has mainly been determined by the volume required for projecting an image of a large stationary original onto a moving photosensitive surface. A copying machine such as that described in U.S. Pat. No. 3,062,109 uses an optical system comprising two fixed mirrors with a lens between the mirrors, the stationary original being illuminated by lamps on a movable lamp carriage, and light from the original being screened from the projection system except for a small slit between the lamps.

U.S. Pat. No. 3,512,885 describes a document copying machine in which the whole of the stationary original is illuminated during exposure, and scanning is achieved by oscillating one of the mirrors of the projection system about an axis in its plane. The size of this document copying machine is still very large.

It has been proposed, for example, in U.S. Pat. No. 3,642,366 to have a more compact image projection system in which two mirrors are moved in different directions at speeds relating to the speed of movement of the photosensitive surface. Although the size of the optical projection system is reduced, the complexity of the scanning drive system is increased because there are two mirrors to be moved in different directions. In the present invention, two reflecting surfaces are moved together without relative movement.

According to the present invention there is provided photocopying apparatus for reproducing a stationary original at a plane exposure area on a moving photosensitive surface, the apparatus comprising optical means for progressively scanning the surface of the original and directing the scanning beam to a fixed exposure area, said means comprising two plane reflecting surfaces arranged symmetrically at 45° to a normal to the exposure area forming a mouth extending parallel to the exposure area, the length of each mirror resolved along the exposure area being equal to at least half of the length of the exposure area, and drive means for moving the mirrors together parallel to the exposure area between a first position in which the end of one mirror remote from the other mirror lies opposite one end of the exposure area and a second position in which the other end of said one mirror is opposite the other end of said area.

Figure 2:
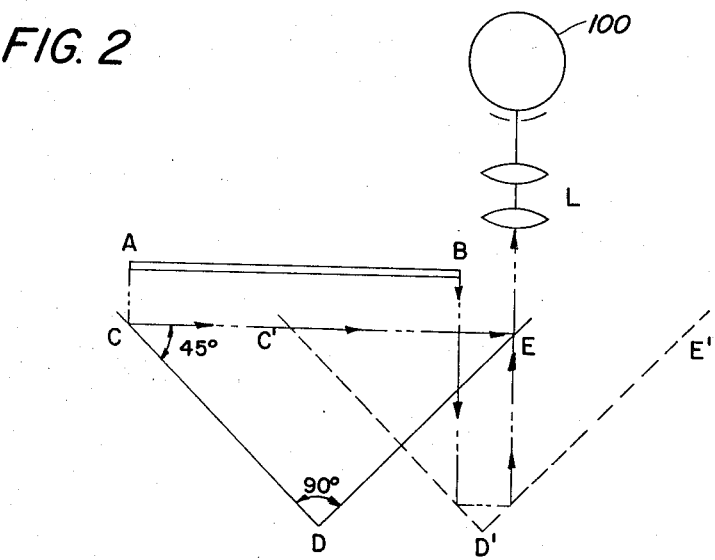
Figure 3:
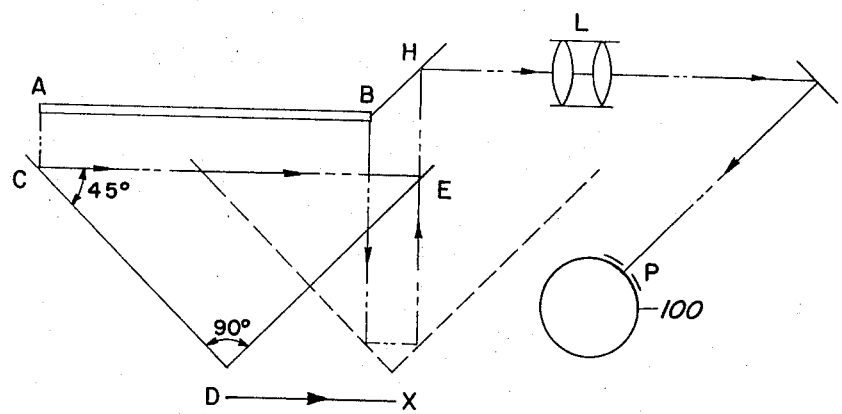

Examples of the invention will now be described with reference to the accompanying drawings, in which:

FIG. 1 is a schematic section elevation of photocopying apparatus incorporating a conventional document scanning system, FIG. 2 is a schematic diagram of an optical scanning system according to the present invention, and FIG. 3 is a schematic diagram of an alternative optical scanning system according to the invention.

For a general understanding of the xerographic processing system reference is made to FIG. 1 in which the various system components are schematically illustrated.

It should be understood that xerographic machines can include other forms of these components. The xerographic apparatus described herein may be an adaptation of the type disclosed in Eichler et al, U.S. Pat. No. 2,945,434. As in all xerographic systems based on the concept disclosed in U.S. Pat. No. 2,945,434, a radiation image of copy to be reproduced is projected onto the sensitized surface of a xerographic plate forming an electrostatic latent image thereon. Thereafter, the latent image is usually developed with an electroscopically charged developing material to form a xerographic powder image, corresponding to the latent image on the plate surface. The developed image is then transferred to a support surface to which the image is permanently affixed by means of a fuser apparatus.

As shown in FIG. 1, there is illustrated a light-tight cabinet 10 for enclosure and containment of all the operative components. Copy to be reproduced, such as a book, sheet or the like, here designated 11, is supported at a copy station 12. The copy station includes a horizontally arranged transparent platen support 13 such as glass, on which the copy rests in position to be optically scanned. Projection of the copy image is achieved by means of a scanning mechanism that in this embodiment includes a pair of transversely extending fluorescent lights 22 and 23 that are adapted to move horizontally from the position shown solid to the position shown dashed as more fully described in the above-cited Eichler patent. Light shields 24 and 25 prevent stray light from being transmitted from the lamps other than that which is utilized for illuminating the copy above. An image of the illuminated copy is reflected through objective lens 26, which moves horizontally in conjunction with the lamp, for projecting an image downwardly through an aperture slit 28 and onto the surface of a xerographic plate which in this embodiment is in the form of rotating drum 29.

Xerographic drum 29 includes a cylindrical member mounted in suitable bearings in the frame of the machine and is driven in a counterclockwise direction by a motor 30 at a constant rate that is proportional to the scanning rate of the copy, whereby the peripheral rate of the drum surface is identical to the scan rate of the reflected light image. The drum surface comprises a layer of photoconductive insulating material 31, which may, for example, be vitreous selenium, supported on a conductive backing 32, such as aluminum. Prior to exposure, the drum surface is sensitized by means of a corona generating device 33, which may be an adaptation of the type disclosed in Vyverberg, U.S. Pat. No. 2,965,756, and which is energized from a suitable high potential source (not shown).

The exposure of the drum to the light image discharges the photoconductive layer in the areas struck by light, whereby there remains on the drum a latent electrostatic image in image configuration corresponding to the light image projected from the copy. As the drum surface continues its movement the electrostatic latent image passes through a developing station 40 in which a two component (toner and carrier) developing material 41, which may be the type disclosed in U.S. Pat. No. 2,638,416 is cascaded over the drum surface by means of a developing apparatus 42.

In the developing apparatus, the two component developing material 41 is carried upwardly by conveyor 43 driven by suitable drive means and released onto chute 44 wherefrom it cascades down over the drum surface effecting development of the latent image thereon. Toner component 45 of the developer that is consumed in developing is stored in dispenser 46 and is released in amounts as controlled by the dispensing mechanism.

After developing, the powder image passes through an image transfer station 50 at which the powder image is transferred by means of a second corona generating device 33 mentioned above, to a sheet of copy paper 53. The copy sheets are arranged in stack form on a supply tray 54 and are fed therefrom individually by means of a mechanical feeder 55 adapted to feed the top sheet of the stack through driven feed rollers 56 which direct the sheet material into contact with the rotating drum in coordinated registration with the arrival of the developed image at the transfer station.

Following transfer, a pick-off mechanism 57 ensures removal of the copy sheet from the drum surface wherefrom the copy sheet is directed onto an endless conveyor 58 whereby the copy sheet is carried past the fusing and cleaning devices of the invention respectively and designated as 60 and 61. The image is permanently affixed thereat by the fuser onto the copy sheet. Thereafter, the finished copy passes through further feed rolls into a vertical conveying system 65 by means of which the copy is delivered to a copyholder 66 supported along the top portion of cabinet 10 from where it may conveniently be removed by an operator.

After transfer, the xerographic drum surface passes through a cleaning station 70 at which the surface is brushed by cleaning brush assembly 71, whereby residual developing material remaining on the drum surface is removed. The powder removed from the drum surface is exhausted through port 72 by means of suction provided from fan 73 and becomes lodged in a removable filter bag 74. The drum surface then passes through a discharge station 75 at which it is illuminated by a fluorescent lamp 76 whereby the drum surface in this region is completely flooded with light to remove any electrostatic charge that may remain thereon. Suitable light traps are provided in the system to prevent any light rays from reaching the drum surface other than the projected image, during the period of drum travel immediately prior to sensitization by corona generating device 33 until after the drum surface is completely passed through the developing station 40.

Referring to FIG. 2, the optical projection system of the photocopying apparatus illustrated in FIG. 1 is illustrated schematically in FIG. 2. A flat transparent platen AB is arranged to support a document to be copied which is placed face downwards on the platen. A mirror assembly is mounted for scanning movement below the platen and parallel to it. The mirror assembly comprises two mirrors CD and DE having plane reflecting surfaces facing inwardly and each arranged at 45° to a normal to the platen. The two reflecting surfaces meet at a line, and their mouth CE is slightly longer than the length of the platen, that is, the length of each mirror resolved along the platen is greater than half the length of the platen.

The document on the platen is scanned progressively from the left hand to the right hand side. In the position illustrated in full lines in FIG. 2, an area across the document at the left hand end is projected from the top of the reflecting surface CD across to the top of the reflecting surface DE and upwardly through the lens L to the photosensitive surface of the xerographic drum 100. As the mirrors CD and De are scanned across the platen, the portion of the document on the platen from which light is projected by the mirrors CD and DE through the lens L onto the drum moves progressively to the right hand side of the document. At the end of the scan, light from the right hand end of the document is projected from the bottom end of the mirror CD across to the bottom end of the mirror DE and upwards through the lens to the drum. At this end-of-scan position the bottom end of the mirror CD is located below the right hand end of the platen, so that the mirror assembly has moved by half the length of the platen during its scanning path. Because both the mirrors move together at the same velocity, the velocity of the image in the beam reflected from the mirror DE is twice that velocity, and the drum must be moved with a surface speed equal to that double velocity modified by the magnification factor of the optical system between the mirror DE and the drum. For a 1:1 magnification factor the mirrors move at one-half the surface velocity of the drum.

As only one narrow transverse portion of the document is being projected onto the drum at any one time, it is possible to illuminate only that portion as has been described in U.S. Pat. No. 3,062,109. The illuminating device must move at double the velocity of the mirror assembly. It may be more convenient to illuminate the whole of the document on the platen, as in U.S. Pat. No. 3,512,885, particularly as high intensity lamps are delicate instruments which may be damaged by the vibration of the scanning travel and particularly the accelerations and decelerations at the ends of the travel.

FIG. 3 shows an alternative optical projection system in which a stationary mirror BH is located adjacent the end of the platen to fold the projection path from the mirror assembly CDE to the drum 100 in order to produce a more convenient arrangement for the photocopying machine. The principles of operation are the same as that described with respect to FIG. 2. The second stationary mirror Y is required to bring the total number of mirrors to an even number which is required to produce a right-reading image on the drum.

In order to save weight, where this is important, the mirrors CD and DE may be manufactured of a material other than glass, for example, aluminized plastic film. One mirror in the optical system of U.S. Pat. No. 3,642,366 is of comparable size to the present mirrors, and it is believed that the additional weight of the present second large mirror would be less than the weight of the additional driving mechanism required for the second smaller mirror in the earlier system. Furthermore, more vibration of the projected image is likely with two independently driven mirrors than with two mirrors which are driven together as a single unit.

The above-noted patents are intended to be incorporated by reference into this application.

It is apparent that there has been provided in accordance with this invention a scanning apparatus which fully satisfies the objects, means and advantages set forth hereinbefore. While the invention has been described in conjunction with specific embodiments therefore, it is evident that many alternatives, modifications, and variations will be apparent to those skilled in the art in light of the foregoing description. Accordingly, it is intended to embrace all such alternatives, modifications and variations as fall within the spirit and broad scope of the appended claims.

What is claimed is:

1. A scanning apparatus for reproducing a stationary original supported in a plane upon a platen of given length, the apparatus including optical means comprising means for progressively scanning the surface of the original and a lens means for receiving the image from said scanning means, and for projecting the scanned image on a photosensitive surface moving at a given velocity, the improvement wherein: said optical means continuously scans said original and comprises two plane reflecting surfaces facing inwardly of each other and arranged symmetrically at 45° to a normal to the platen, the length of each of said reflecting surfaces resolved along the platen being greater than half of the length of the platen, said reflecting surfaces moving parallel to the platen at a velocity of one-half the velocity of said photosensitive surface to scan said original.

2. An apparatus as in claim 1 wherein said reflecting surfaces comprise mirrors and wherein said mirrors move a distance which is less than the length of said platen in the scanning direction.

3. An apparatus as in claim 2 wherein said mirrors meet at a line and their mouth is slightly longer than the length of the platen.

4. An apparatus as in claim 3 further including at least one stationary mirror receiving light from said moving mirrors for folding the projection path from said moving mirrors.

5. An apparatus as in claim 4 wherein an even number of fixed mirrors are arranged to direct the light after reflection from both moving plane reflecting surfaces.

* * * * *